(12) United States Patent
Tang

(10) Patent No.: US 8,872,968 B2
(45) Date of Patent: *Oct. 28, 2014

(54) ADAPTIVE WINDOWING IN MOTION DETECTOR FOR DEINTERLACER

(71) Applicant: CSR Technology Inc., Sunnyvale, CA (US)

(72) Inventor: Monica Man Kay Tang, Santa Clara, CA (US)

(73) Assignee: CSR Technology Inc., Sunnyvale, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 13/710,847

(22) Filed: Dec. 11, 2012

(65) Prior Publication Data

US 2013/0093951 A1    Apr. 18, 2013

Related U.S. Application Data

(63) Continuation of application No. 12/412,533, filed on Mar. 27, 2009, now Pat. No. 8,355,077.

(60) Provisional application No. 61/040,027, filed on Mar. 27, 2008.

(51) Int. Cl.
*H04N 11/20*    (2006.01)
*H04N 7/01*    (2006.01)
*H04N 5/14*    (2006.01)

(52) U.S. Cl.
CPC .............. *H04N 7/014* (2013.01); *H04N 7/0137* (2013.01); *H04N 5/144* (2013.01); *H04N 7/012* (2013.01)

USPC ........... 348/452; 348/699; 348/700; 348/701; 348/441; 348/448

(58) Field of Classification Search
USPC ................. 348/441–453, 252, 620, 699–701; 382/181, 220, 260

See application file for complete search history.

(56) References Cited

U.S. PATENT DOCUMENTS

| 5,036,393 | A  | * | 7/1991  | Samad et al. ................. 348/452 |
| 5,995,660 | A  |   | 11/1999 | Andoh et al. |
| 6,480,670 | B1 | * | 11/2002 | Hatano et al. ................. 386/329 |
| 6,628,341 | B1 |   | 9/2003  | Staley et al. |
| 7,098,957 | B2 |   | 8/2006  | Kim et al. |
| 7,412,096 | B2 |   | 8/2008  | Neuman et al. |
| 7,545,984 | B1 |   | 6/2009  | Kiel et al. |
| 7,848,427 | B2 | * | 12/2010 | Horishi et al. ........... 375/240.16 |
| 8,295,367 | B2 |   | 10/2012 | Tang et al. |
| 8,406,303 | B2 | * | 3/2013  | Hoffman et al. ......... 375/240.16 |
| 2002/0047919 | A1 | * | 4/2002 | Kondo et al. ................ 348/441 |
| 2005/0168633 | A1 | * | 8/2005 | Neuman et al. .............. 348/448 |
| 2005/0168653 | A1 | * | 8/2005 | Wyman ........................ 348/700 |
| 2005/0168655 | A1 |   | 8/2005 | Wyman et al. |

(Continued)

*Primary Examiner* — Jefferey Harold
*Assistant Examiner* — Humam Satti
(74) *Attorney, Agent, or Firm* — Vorys, Sater, Seymour and Pease LLP; Vincent M. DeLuca

(57) ABSTRACT

A method of determining a motion value for a missing pixel in an interlaced video field using an adaptive window. The method includes computing a first mean absolute difference (MAD) value for a pixel based on a 1×5 window, computing a second MAD value for the pixel using a 3×5 window, and selectively blending the first and second MAD values to form a resultant motion value.

17 Claims, 8 Drawing Sheets

(56) References Cited

U.S. PATENT DOCUMENTS

| | | |
|---|---|---|
| 2005/0231644 A1* | 10/2005 | Salzer et al. ............. 348/701 |
| 2006/0023788 A1* | 2/2006 | Otsuka et al. ........ 375/240.16 |
| 2006/0125956 A1 | 6/2006 | Lee |
| 2006/0158550 A1 | 7/2006 | Zhou et al. |
| 2006/0181647 A1* | 8/2006 | Fazzini ..................... 348/570 |
| 2007/0103570 A1 | 5/2007 | Inada et al. |
| 2007/0236609 A1* | 10/2007 | Pathak et al. ............. 348/620 |
| 2008/0063075 A1* | 3/2008 | Kondo et al. ......... 375/240.16 |
| 2008/0106642 A1* | 5/2008 | Srinivasan et al. ......... 348/452 |
| 2008/0129863 A1* | 6/2008 | Neuman et al. ............ 348/448 |
| 2009/0244369 A1 | 10/2009 | Tang et al. |
| 2009/0244389 A1* | 10/2009 | Mishima et al. ........... 348/699 |
| 2009/0324121 A1 | 12/2009 | Bhagavathy et al. |
| 2011/0096231 A1* | 4/2011 | Winger et al. ............. 348/448 |
| 2013/0128112 A1* | 5/2013 | Tang et al. ................ 348/452 |

* cited by examiner

ADAPTIVE WINDOWING IN MOTION DETECTOR FOR DEINTERLACER

RELATED APPLICATIONS

This application claims the benefit under 35 U.S.C. §120 as a continuation of U.S. application Ser. No. 12/412,533 titled "Adaptive Windowing in Motion Detector for Deinterlacer," filed on Mar. 27, 2009, which claims priority under 35 U.S.C. §119(e) to U.S. Provisional Application Ser. No. 61/040,027, titled "Adaptive Windowing in Motion Detector for Deinterlacer," filed on Mar. 27, 2008, each of which is incorporated herein by reference in its entirety.

BACKGROUND OF INVENTION

1. Field of Invention

The present invention relates to motion detection used in connection with deinterlacing fields of an interlaced video signal.

2. Discussion of Related Art

Video images are displayed on monitors or display screens of various types as a time-sequence of frames shown quickly enough to deceive the human eye into perceiving that sequence of frames as a continuously moving picture. Each frame consists of a collection of lines of pixels, the precise number of which depend on the technology implemented. For historical reasons, for example reasons which took advantage of older technologies to reduce perceived flicker arising from such an arrangement, each frame was further divided into two fields, each of which contained half of the lines comprising the frame. One field contained every other line of the frame, e.g., the even lines, and the other field contained the lines not included in the first field, e.g., the odd lines. Fields were displayed in even, odd, even, odd, etc. sequence, at twice the frame rate, thus reducing flicker and displaying the sequence of frames at the frame rate. Such an arrangement of fields to form frames is referred to as an interlaced scan display.

Another way of displaying frames is to simply display each line of a frame in sequence, and with such timing as to display frames at the desired frame rate. Such an arrangement of display is referred to as a progressive scan display.

When video images are broken down into a sequence of serial elements so as to form a serial signal that can be transmitted from a video image source to a video image display, the two-field arrangement is conventionally still used. Therefore, video image display devices that employ progressive scan display de-interlace the signal so it can then be used to produce entire fields at one time.

In conventional deinterlacer devices, for example, the Supra HD780 available from Zoran Corporation, frame motion detection is used as shown in FIG. 1. Conventional frame motion detection compares fields of the same polarity, i.e., even-even or odd-odd.

A video image stream 101 is loaded into a buffer 103. At time t-1, frame motion detection is performed by a detector 105 between Field 0 and Field 2. A motion value 107 is computed for each corresponding pair of pixels based on a finite window of pixels around that for which the value is being computed. This motion value is then quantized into a 2-bit motion value, k, by comparing a quantitative measure of motion detected to thresholds. This motion value, k, is then written to memory 109, which would be read back at time t. Also at time t-1, motion values 108 representing motion detected between Field 1 and Field 3 which were previously computed and stored in memory 109, or simultaneously computed by detector 111 and stored in memory 109 are read from memory 109. Hence, at time t-1, two motion values are available. Conventionally, one frame motion detector (frame motion detector 1-3) 111 detects motion between field 1 and field 3, while another (frame motion detector 0-2) 105 detects motion between field 0 and field 2. (See also FIG. 2). A goal of this process is to predict the values of pixels in a frame which are not part of the current field, i.e., the current missing pixels.

Processing by a processor 113, then proceeds as follows: The buffer 103 is read out 115 and an output stream 117 either weaved or interpolated are described. To calculate the final k value for a particular current missing pixel, the following is done:

Let k13_top=k value from pixel immediately above the current missing pixel from frame motion detector 13

Let k13_bot=k value from pixel immediately below the current missing pixel from frame motion detector 13

Let k02=k value calculated from frame motion detector 02

```
if (k13_top > k02 && k13_bot > k02)
    k_final = max (k13_top, k13_bot)
else
    k_final = k02
end.
```

The current design suffers from motion aliasing, i.e., there is undetected motion. This results in feathering artifacts.

In the Supra HD780, the frame motion detector uses a 3-line by 5-pixel wide window to calculate the Mean Absolute Difference (MAD) as the frame motion value for each pixel.

The MAD of a pixel in missing row i, column j, at time t is calculated between the future and the past fields as follows:

$$MAD(i, j, t) = \frac{\sum_{k=-1}^{1} \sum_{l=-2}^{2} |p(i+k, j+l, t+1) - p(i+k, j+l, t-1)|}{16}.$$

The motivation for utilizing a 3×5 window is to suppress the effects of noise.

However, because such a big window is used for motion detection, motion that is far away from the missing pixel will affect the amount of motion detected at the missing pixel, resulting in the detection of motion where there is none.

The MAD values computed by the motion detector are compared to 3 programmable thresholds to create a 2-bit 'k' value:

$$kf_{frame} = \begin{cases} 0, & \text{if } (MAD \leq \text{reg\_frame\_mdetect\_thresh\_a}) \\ 1, & \text{if } (MAD > \text{reg\_frame\_mdetect\_thresh\_a} \ \&\& \ MAD \leq \text{reg\_frame\_mdetect\_thresh\_b}) \\ 2, & \text{if } (MAD > \text{reg\_frame\_mdetect\_thresh\_b} \ \&\& \ MAD \leq \text{reg\_frame\_mdetect\_thresh\_c}) \\ 3, & \text{if } (MAD > \text{reg\_frame\_mdetect\_thresh\_c}) \end{cases}$$

reg_frame_mdetect_thresh_a ≤ reg_frame_mdetect_thresh_b ≤ reg_frame_mdetect_thresh_c This final result from ('k' value) is used by the output blender to generate the missing lines of the output frame, at each field time. The output frame is either weaved from successive odd/even field, interpolated from a single field, or a combination of the two. If motion in the scene is significant, weaving between fields is more likely to produce a field tearing artifact. A 2-bit 'k' motion value allows for four blending ratios in the output blender. The values currently used are summarized in the table below:

| 'k' motion value | Weave (%) | Interpolate (%) |
|---|---|---|
| 0 | 100 | 0 |
| 1 | 50 | 50 |
| 2 | 25 | 75 |
| 3 | 0 | 100 |

The k motion value is quantized into a 2-bit value by comparing to programmable thresholds. This quantization creates quantization error. Moreover, 4-level blending creates undesired artifacts in high frequency images.

In the Supra HD780, field motion detectors detect motion on two fields of opposite polarities, in addition to frame motion detection based on fields of the same polarity. When the frame motion detection and the field motion detection disagree substantially, a recursive frame motion algorithm is used to detect motion. A counter is used to keep track of situations when the results of the frame motion detector and field motion detector conflict. The counter value is compared to a threshold (moving_threshold below) and used to modify the 'k' motion value.

```
If (k_field > threshhold) // field motion detector detects some
motion
   If (k_frame == 0) // frame motion detector doesn't detect any
motion
      historical_motion_counter = historical_motion_counter + 1;
   Else
      historical_motion_counter = historical_motion_counter − 1;
Else
   historical_motion_counter = 0.
```

The historical_motion_counter is saved on the field buffer and read on the next field.
k_curr_frame' is modified as follow:

```
If (k_field > teething_threshold & historical_motion_counter <
moving_threshold)
   k_curr_frame' = k_frame + 1
Else if (k_prev_frame > k_curr_frame)
   k_curr_frame' = k_prev_frame − 1
Else
   k_curr_frame' = k_curr_frame.
``` k_frame is modified as follows:

```
If (k_field > teething_threshold & historical_motion_counter <
moving_threshold)
   k_frame' = k_frame +1
Else
   k_frame' = k_frame.
``` k_frame' can be used as the k motion value.

The recursive motion method embodied in the Supra HD780 requires a 4-bit per pixel field buffer to store the historical counter value, based on using a 2-bit k motion value. This method still produces artifacts in static high vertical frequency images, where single-time details are present.

SUMMARY OF INVENTION

According to aspects of embodiments of the invention, a method includes: computing a first mean absolute difference (MAD) value for a pixel based on a 1×5 window; computing a second MAD value for the pixel using a 3×5 window; and selectively blending the first and second MAD values to form a resultant motion value. In some variations, the method may further include selectively blending according to:

```
topbot_diff1 = abs((next_top + prev_top)/2 − (next_mid +
prev_mid)/2));
topbot_diff2 = abs((next_bot + prev_bot)/2 − (next_mid +
prev_mid)/2));
topbot_diff = max([topbot_diff1 topbot_diff2]) −
topbot_thresh;
blend = topbot_diff + blend_res/2;
if (blend<0)
   blend = 0;
elseif (blend>blend_res)
   blend = blend_res;
end.
```

In yet further variations, the method can include providing a blend factor that varies with MAD according to:

```
frame02 = round(((sad02_win1x5)*3/16 * blend) + (sad02_win3x5/
16 * (blend_res-blend)))/blend_res;
``` done on all frame motion detectors in the deinterlacer. (i.e. including frame04)

In the new design, a 16-step blending value is used. MAD value is normalized as follows:

```
mad_curr_cored = round((mad_curr-mad_core_thresh)*
mad_core_normalize);
``` where mad_core_thresh and mad_core_normalize are programmable registers, and mad_curr_cored is made to saturate at a value of 16. Forcing mad_curr_cored to saturate at 16 may be done by any suitable means. The following illustrates the transfer function of the blending factor:

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
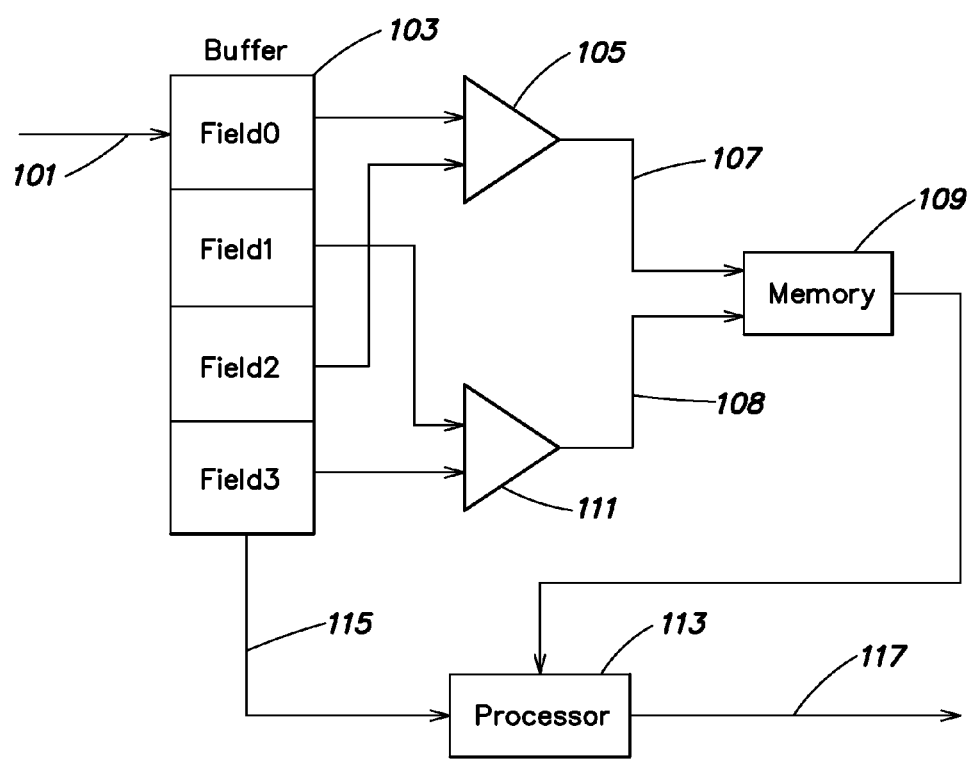
FIG. 1 is a block diagram of a prior art system for frame motion detection.
Figure 2:
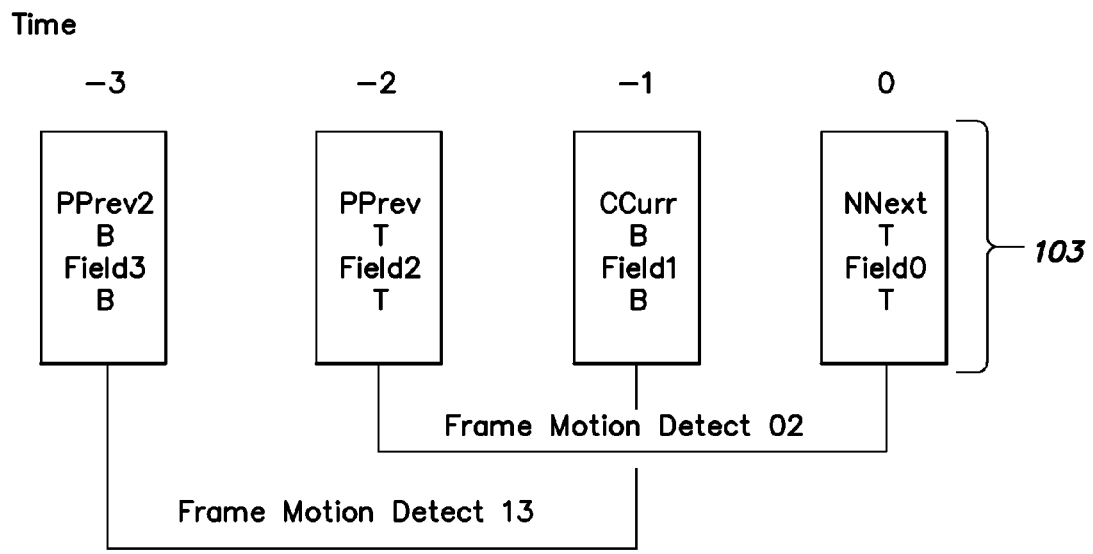
FIG. 2 is a representation of frame memory contents compared using the prior art system.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items. The invention is illustrated by the following description of aspects of embodiments thereof. Some aspects and embodiments relate to different parts of a larger aspect or embodiment, and represent alternatives that may be combined variously to form variations on a larger embodiment.

The exemplary aspects and embodiments relate to deinterlacers used in high definition television (HDTV) displays, although other applications will occur to the skilled artisan.

Figure 3A:
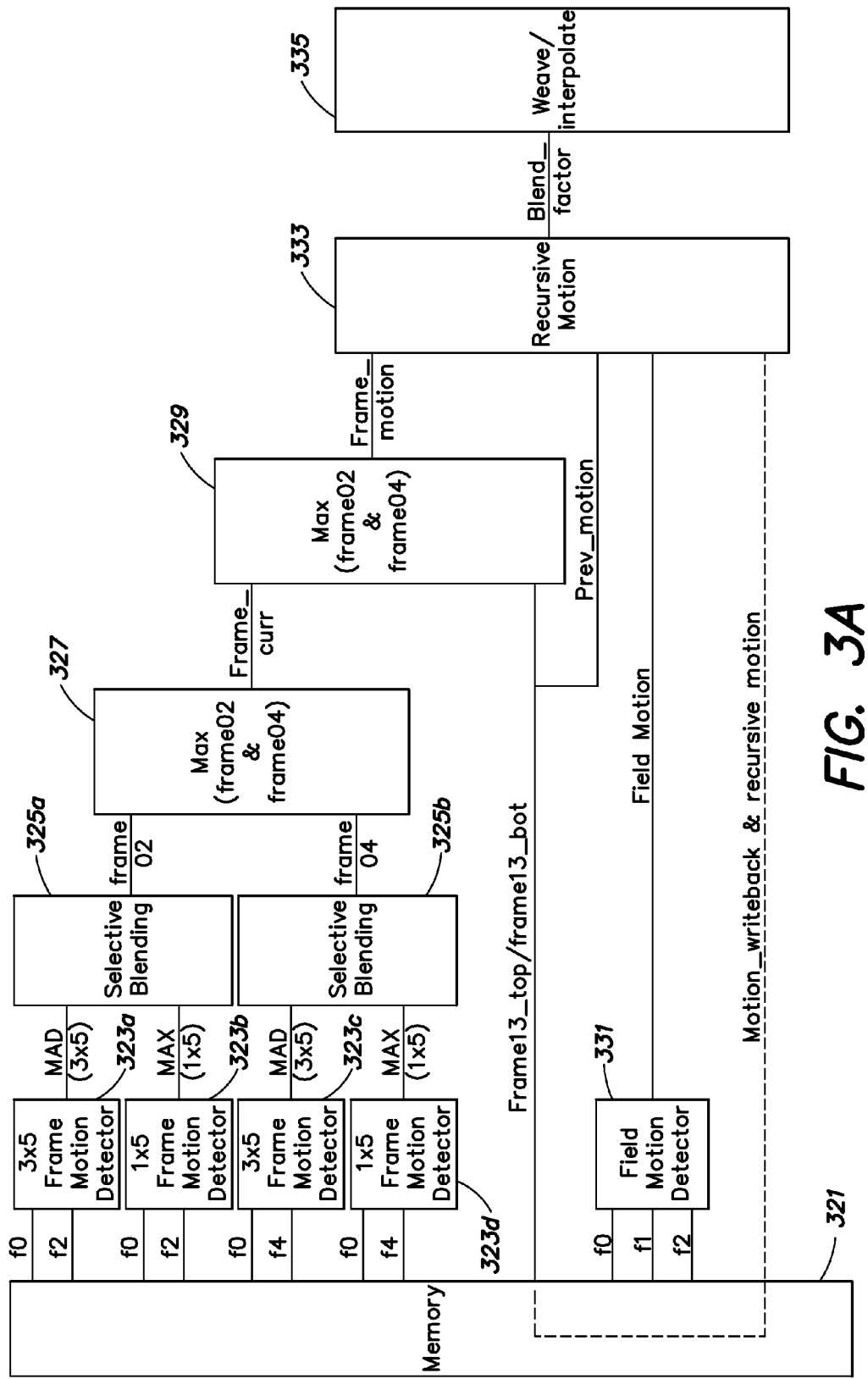
FIG. 3A is an overview block diagram of aspects of an embodiment.

A high-level overview of the system according to aspects of some embodiments is shown in FIG. 3A. The elements shown may be implemented as software executing on a suitable general purpose processor, special purpose image processor, digital signal processor (DSP), or the like, or as specialized hardware implementing the various functions in logic, or as a combination of these. In some implementations, where a function is called for to process different input values, only one instance of the function may be incorporated into the implementation, and reused at different points in time, or, alternatively, multiple instances of the function may be incorporated into the implementation, and the multiple instances used in parallel.

The system includes a memory, 321, in which input buffers, output buffers, temporary storage registers and the like are defined to hold various values, such as the values comprising the serial elements of the serial signal. Connected to the memory, 321, are four frame motion detectors, 323*a*, 323*b*, 323*c* and 323*d*, two of which detect motion between fields 0 and 2, 323*a* and 323*b*, and two of which detect motion between fields 0 and 4, 323*c* and 323*d*. Two of the frame motion detectors, 323*a* and 323*c*, employ a three-line by five-pixel window, while the other two frame motion detectors, 323*b* and 323*d*, employ a one-line by five pixel window. The results of frame motion detection are pair-wise inputs to selective blending, 325*a* and 325*b*, to produce motion values corresponding to one-frame, frame02, and two-frame, frame04, intervals. The blended results corresponding to one-frame, frame02, and two-frame, frame04, intervals are further processed, 327 and 329, as described in connection with FIG. 5, below.

A field motion detector, 331, receives frames 0, 1 and 2, and produces a field motion result. Frame and field motion results are used by a recursive motion module, 333, to determine whether recursive motion detection is required by the nature of the serial signal. Finally, the blend factor computed by selective blending, 325*a* and 325*b*, is applied to a weaver/interpolator, 335, which employs a degree of weaving and an inverse degree of interpolating determined by the blend factor to create predicted pixels in an output field.

The operation of the system whose overview has been presented in connection with FIG. 3A is now described in connection with FIGS. 3B, 4, 5, 6 and 7.

Figure 3B:
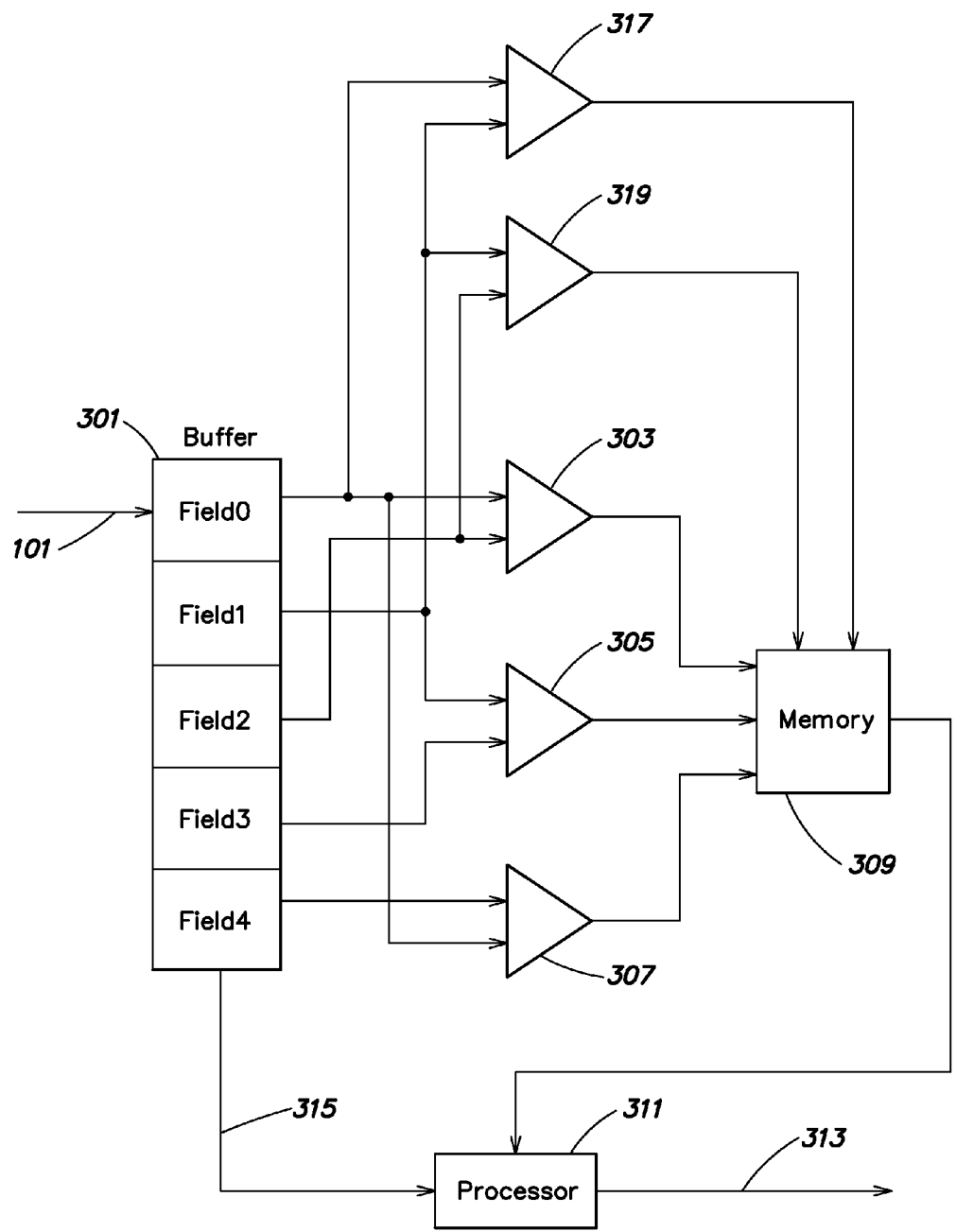
FIG. 3B is a lower-level block diagram of aspects of an embodiment.
Figure 4:
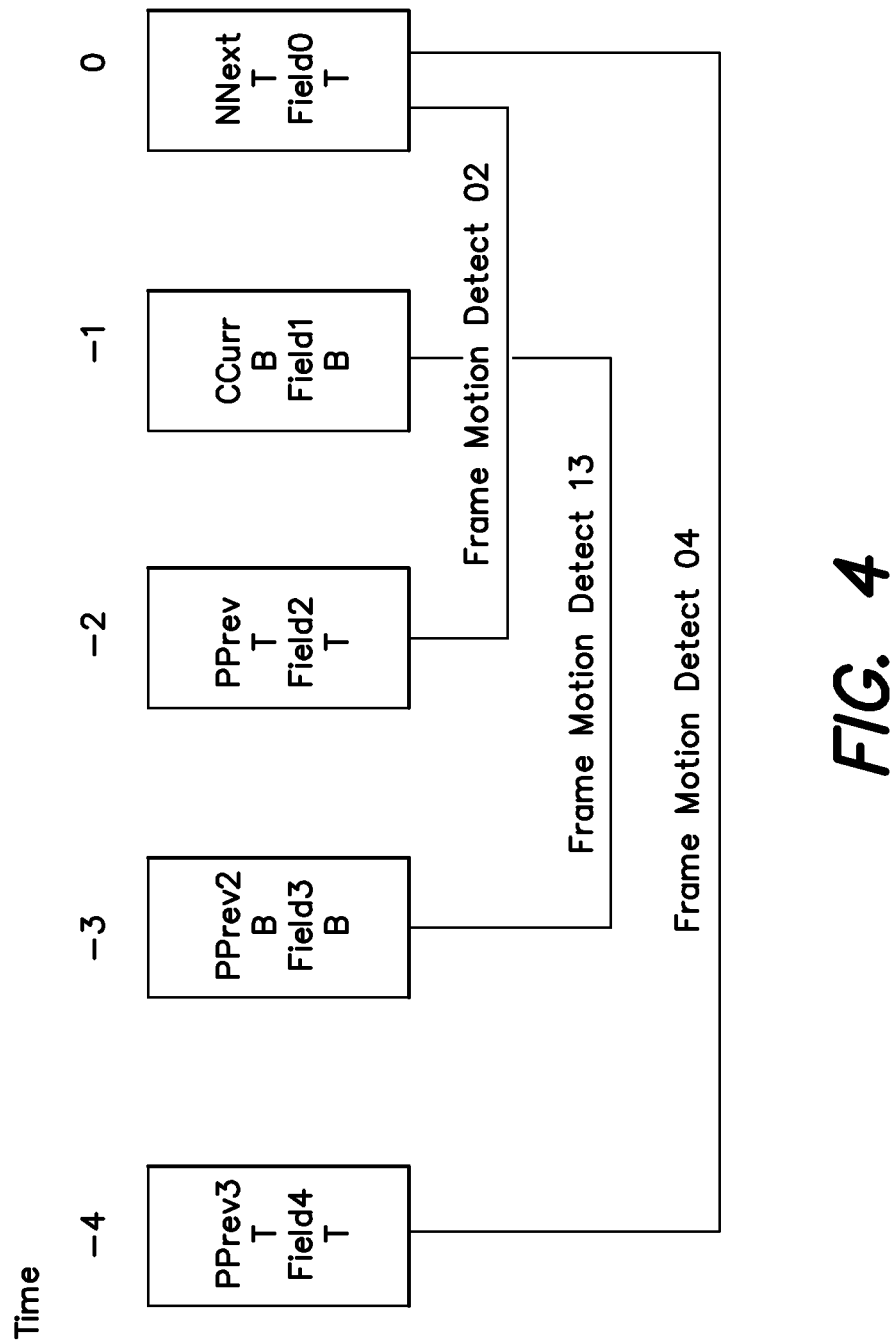
FIG. 4 is a representation of frame memory contents compared using the system.

According to aspects of embodiments shown in FIG. 3B, a serial signal 101 representing in digital form an interlaced video signal is received into a buffer memory 301. A processor, which may be special-purpose processor, or a general-purpose processor, or a digital-signal processor reads the signal from the buffer memory, performs various method steps and writes a result to a buffer memory or other output. The method includes frame motion detection, windowing and recursive frame motion detection as described below.

Basic Motion Detection

According to aspects of an embodiment, frame motion detection is done between three pairs of fields. Frame motion detection is done between fields 0 and 2 by detector 303 and fields 1 and 3, by detector 305 as well as between fields 0 and 4 by detector 307. This improves the overall frame motion detector's ability to detect motion over that of conventional detectors, hence reducing feathering artifacts. (See also FIG. 4).

Figure 5:
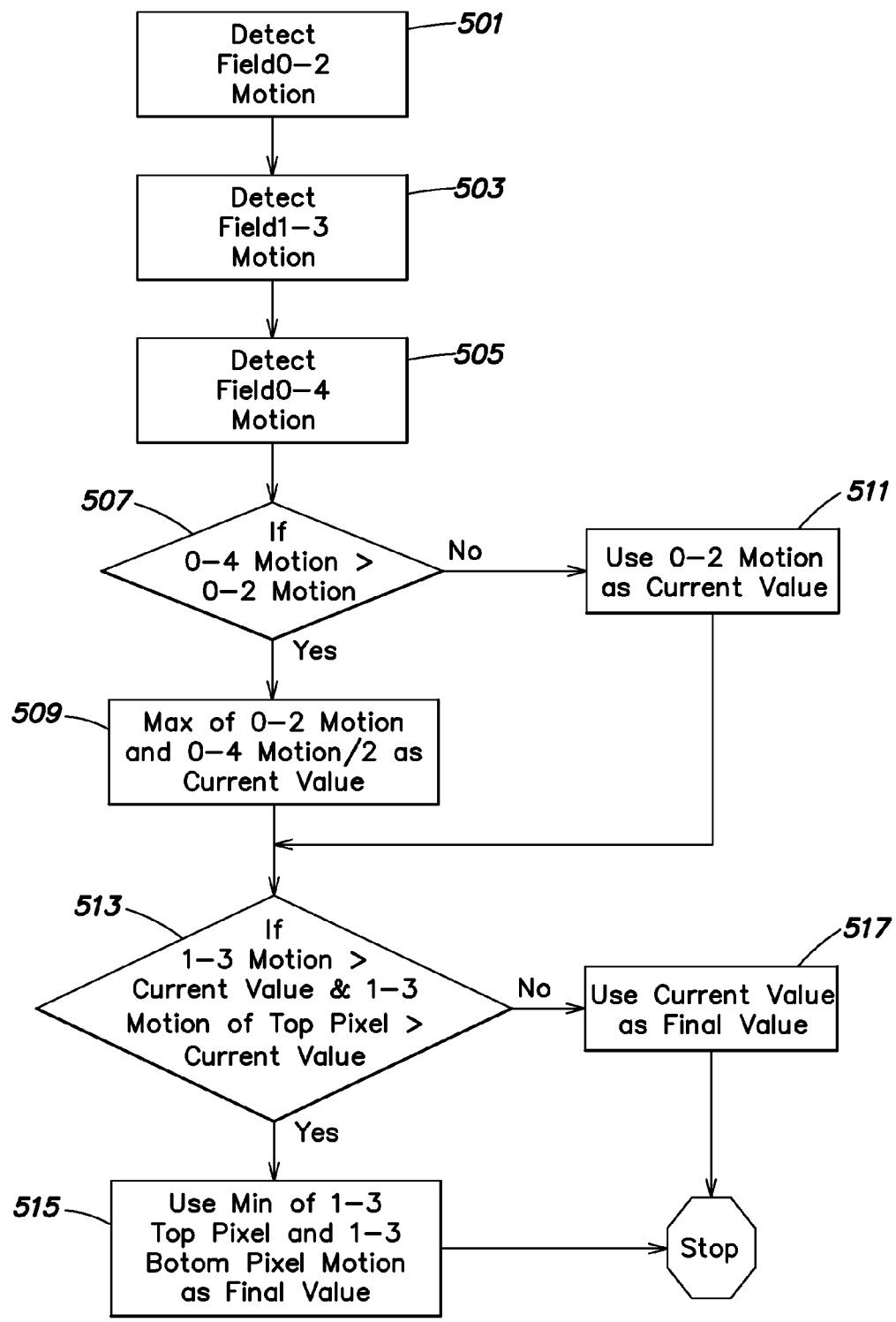
FIG. 5 is a flow diagram of a method according to an embodiment of aspects of the invention.
Figure 6:
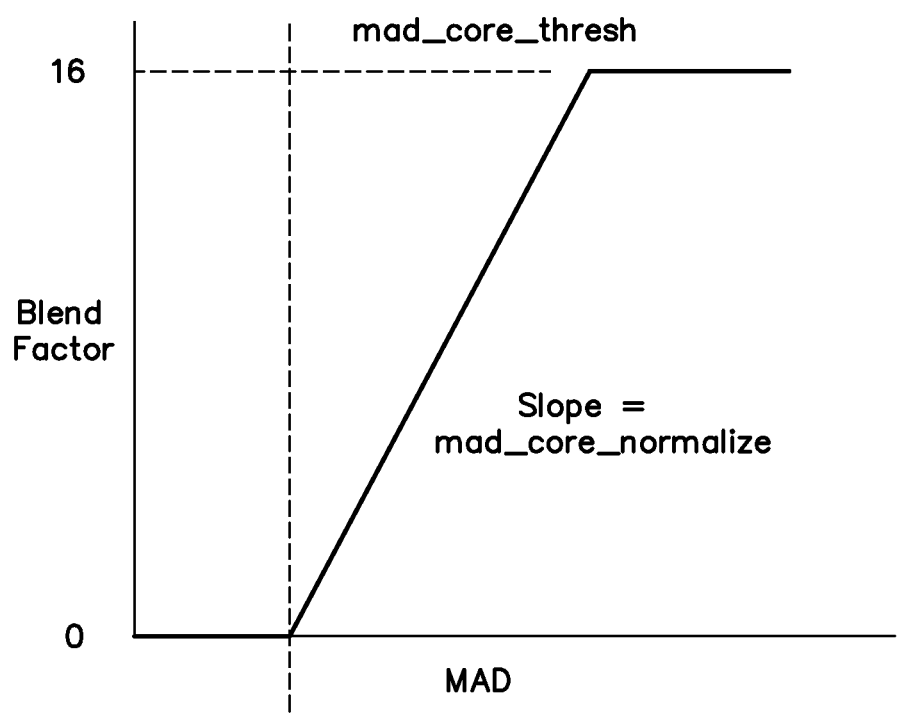
FIG. 6 is a graph of the blending function.

Detector results are stored in memory 309, after which they are processed by processor 311 then produces an output stream 313 from the series of fields 315 read from buffer 301. In accordance with the method according to aspects of an embodiment, as shown in FIG. 5, to calculate the final motion value, the following is done:

Let frame13_top=frame motion value from pixel immediately above the current missing pixel from frame motion detector 13

Let frame13_bot=frame motion value from pixel immediately below the current missing pixel from frame motion detector 13

Let frame02=frame motion value calculated from frame motion detector 02

Let frame04=frame motion value calculated from frame motion detector 04

With three motion detector values available, (FIG. 5, 501, 503, 505) the current frame motion value is determined as follows. The order in which the three values are obtained does not matter.

```
if (frame04 > frame02) (FIG. 5, 507)
    frame_curr = max(frame02, frame04/2); (FIG. 5, 509)
else
    frame_curr = frame02; (FIG. 5, 511)
end.
```

When an object is moving within the 5-field window, the motion value of frame04 will be about twice that of frame02, and so the maximum of either frame02 or frame04/2 is used, 509. However, when the object is fast moving (i.e. it moves beyond the 5-field window), the motion values of frame04 and frame02 will be the same. The pseudocode above provides that the value of frame02 is then used, 511.

With this new current frame motion value, the same conditions apply as before, to calculate the final motion value:

```
if (frame13_top > frame_curr && frame13_bot > frame_curr) (FIG.
5, 513)
    frame_final = min(frame13_top, frame13_bot); (FIG. 5 515)
else
    frame_final = frame_curr; (FIG. 5, 517)
end.
```

In contrast with conventional systems, aspects of an embodiment use the minimum value of frame11_top and frame11_bot, 515, instead of using the maximum. According to this aspect, the most accurate motion value is computed, instead of biasing the value to the maximum.

Biasing the value to the maximum was conventionally thought to be superior because doing so forced interpolation to be performed more often in instances where the determination of motion remained uncertain, thus avoiding feathering artifacts that would result from improperly blending when interpolation should be called for. The conventional approach is based on an assumption that the motion detector cannot detect all motion, and therefore should be biased towards detecting more motion. This approach also, however, increases flickering or reduced detail artifacts by interpolating excessively, when blending should have been done instead.

Using the most accurate motion value as described above has now been found to be superior, particularly in connection with the described aspects of embodiments because these aspects of embodiments detect more of the motion actually present, thus increasing, without an artifice such as biasing, the number of instances in which the motion detector detects motion actually present and therefore indicates interpolation should be performed rather than blending. By better matching the use of interpolation and blending to the actual presence or absence of motion in an image, feathering, flickering and reduced detail artifacts are all avoided.

Interpolation and Blending

Interpolation or blending is performed as indicated after performing a Mean Absolute Difference (MAD) computation on a rectangular window of pixels as follows. The windows may be 3×5 or 1×5 as now described.

An error that can occur is called 'false interpolation'. False interpolation occurs when interpolating is performed on pixels for which it should not be done. False interpolation occurs due to detection of motion where none is present, and is most visible on objects with horizontal edge (e.g. a horizontal line). It is not desirable to use a MAD 3×5 window at the edges of a moving horizontal line since false motion will be detected and false interpolation will result, creating visibly obvious artifacts. When a horizontal line appears in such a 3×5 window, away from the pixel under consideration at the center of the window, the horizontal line may appear to signify motion at the pixel under consideration, similarly to noise as described in connection with conventional systems.

Hence, a 1×5 window should be used at horizontal edges to determine the motion value. Of course, the choice of the precise size of the two windows is left to the skilled artisan, with one window having multiple lines and a multiple pixel width, while the other window is vertically narrower to avoid noise and horizontal line artifacts.

The results of 3×5 window MAD and 1×5 window MAD are blended based on the difference between the top/mid lines and mid/bottom lines in the next and previous fields:

```
topbot_diff1 = abs((next_top + prev_top)/2 - (next_mid + prev_mid)/2));
topbot_diff2 = abs((next_bot + prev_bot)/2 - (next_mid + prev_mid)/2));
topbot_diff = max([topbot_diff1 topbot_diff2]) - topbot_thresh;
blend = topbot_diff + blend_res/2;
if (blend<0)
  blend = 0;
elseif (blend>blend_res)
  blend = blend_res;
end;
``` where topbot_thresh, blend_res are programmable registers; topbot_thresh signifies the difference between pixel values that can represent different objects in a picture;
blend is the blend factor; and
blend_res is the blending resolution.

To make the 1×5 window MAD value comparable to the 3×5 window MAD, the 1×5 MAD, the sums of absolute differences for the detector and window (e.g., sad02_win1×5 and sad02_win3×5, for frame02) must be multiplied by 3 before being divided by 16 so they can be blended, as follows.

```
frame02 = round(((sad02_win1×5)*3/16 * blend) +
  ((sad02_win3×5)/16 * (blend_res-blend)))/blend_res.
```

This blending operation is done on all frame motion detectors in the deinterlacer. (i.e. including frame04)

In the new design, a 16-step blending value is used. MAD value is normalized as follows:

```
mad_curr_cored = round((mad_curr-mad_core_thresh) *
  mad_core_normalize);
``` where mad_core_thresh and mad_core_normalize are programmable registers, and mad_curr_cored is made to saturate at a value of 16. Forcing mad_curr_cored to saturate at 16 may be done by any suitable means. The following illustrates the transfer function of the blend factor:

This blend factor is used to blend between the interpolated line and the weaved line. The higher the blend factor (i.e. the higher the MAD value), the more weight is given to the interpolated line. (See FIG. 6).

It is desired to have a 0 response for low MAD values to mask out noise. Hence, for one or more values of MAD near or at 0, the blend factor is forced to saturate at a value of 0 at the low end.

Recursion

Figure 7:
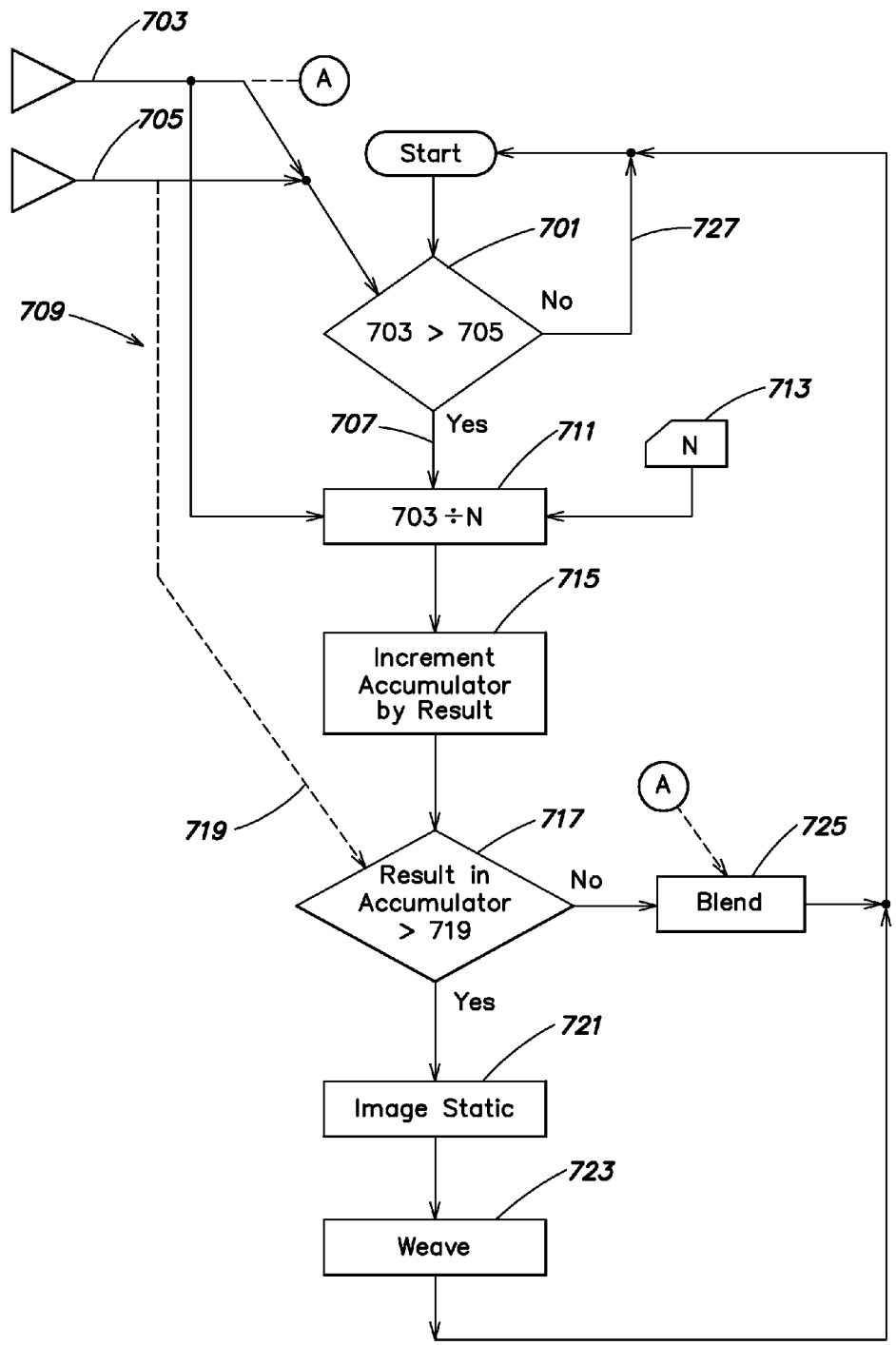
FIG. 7 is a flow diagram of a recursion method according to an embodiment of aspects of the invention.

The system performs a recursive computation under specified conditions, as shown in FIG. 7. This is called recursive motion mode. In order to perform the method shown in FIG. 7, in addition to basic motion detection as described above, the system includes two field detectors (FIG. 3B, 317 and 319), whose outputs are stored and processed (FIG. 3B, 309 and 311) to provide a field motion result which is used together with the frame motion result as described now. The results of the individual field motion detectors (FIG. 3B, 317 and 319) are combined, either algebraically or logically to form the field motion result. Any suitable function can be used to form the combination, such as taking the maximum of the outputs of the two field motion detectors (FIG. 3B, 317 and 319). The field motion detectors are shown in FIG. 3B as separate elements within the overall motion detector structure; however, skilled artisans will recognize that the detectors, memory and processor shown may share or reuse elements, or may be constructed using independent elements, as various implementations may require for purposes of speed or economy of hardware.

The system compares, at 701, the field motion detector result 703 with the frame motion detector result 705. If the field result 703 is greater than the frame result 705, the system enters into 707 recursive motion mode 709.

While in the recursive motion mode 709, the field result 703, divided, at 711, by a programmable number of steps 713, is written back, at 715, to a memory location or register used as an accumulator. Once the accumulator value becomes greater, at 717, than the current field motion detector result 719, the image is considered to be static, at 721—and weaving, 723 is done. Otherwise, at 721, while inside the recursive motion mode 709, the field motion detector result 703 is used as the blend factor to the final blender 725.

Recursive motion mode ends, at 727, when the frame motion detector result is greater than the field motion detector result.

The following is the simplified pseudo code for the logic.

```
If (recursive_motion_mode)
    If (frame_motion > field_motion)
        blend_factor = frame_motion
        motion_writeback = frame_motion
        recursive_motion = 0
    else if (prev_motion >= field_motion)
        blend_factor = frame_motion
        motion_writeback = prev_motion + field_motion /
        steps − frame_motion
        recursive_motion = 1
    else
        blend_factor = blend of field_motion and
        frame_motion
        motion_writeback = prev_motion + field_motion /
        steps − frame_motion
        recursive_motion = 1
    end
else
    if (field_motion > frame_motion)
        blend_factor = field_motion
        motion_writeback = field_motion
        recursive_motion = 1
    else
        blend_factor = frame_motion
        motion_writeback = frame_motion
        recursive_motion = 0
    end
end;
``` where steps is a programmable register (power of 2) defining the number of steps that the deinterlacer will go into weave mode.

recursive_motion is a one-bit indicator that is written back to memory.

recursive_motion_mode is on if either the previous top or previous bottom line of data has recursive_motion_mode on.

prev_motion is the motion data in memory. If both previous top and previous bottom recursive_motion_mode are on, the maximum of the top and bottom motion data is used. Otherwise, the corresponding motion read back data is used.

The motion detector described can be applied to the luminance or chroma components of an image signal, or to both, in accordance with various embodiments.

When film is converted to video, various artifacts peculiar to that process must be taken into account. They are related to the difference in frame rates and the accuracy with which physical film frames are aligned with those digitized counterparts. Therefore, a film detection mode is used. In film detection mode, a dedicated k motion value is used to detect cadences, i.e., those variations that may be film conversion artifacts. This k motion value will also be determined by using the 3×5 MAD window, in an exemplary embodiment.

Due to bandwidth constraints, an extra field of memory read may not be possible in certain usage scenarios. Therefore, there will be an option to use a 3-field deinterlacer instead of 5.

Since embodiments described above perform 3 field reads from memory, bandwidth to accomplish cadence detection over an entire image becomes a major concern. One approach to reduce memory bandwidth is to downsample a field before writing to memory and upsample when reading back. According to an exemplary embodiment, this would be done for field 4 only. Even though this requires an extra memory write client, the memory read and memory write sizes can be significantly reduced, hence reducing both memory footprint and memory bandwidth.

The film mode detector mentioned above is, of course, designed for detecting cadences that occur on the entire image. This solution is best suited for use when a film source fills each image frame entirely, however, for overlayed video, where the video from different sources have different cadence sequences, the film mode detector will fail. One way to address this issue is to limit cadence detection to predetermined or other limited regions, including those as small as a single pixel.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of determining a motion value for a missing pixel in an interlaced video field using an adaptive window, the method comprising:
    computing a first mean absolute difference (MAD) value for the pixel based on a 1×5 window;
    computing a second MAD value for the pixel using a 3×5 window; and
    selectively blending the first and second MAD values to form a resultant motion value.

2. The method of claim 1, wherein computing the first MAD value based on the 1×5 window includes:
    selecting a first 1×5 window of pixels in a first field;
    selecting a corresponding second 1×5 window of pixels in a second field, the second field having a same parity as the first field;
    computing absolute values of differences between values of corresponding pixels in the first 1×5 window of pixels and the second 1×5 window of pixels; and
    averaging the absolute values of differences computed based on the first and second 1×5 windows.

3. The method of claim 2, wherein computing the second MAD value further includes:
    selecting a first 3×5 window of pixels in the first field;
    selecting a corresponding second 3×5 window of pixels in the second field;
    computing absolute values of differences between values of corresponding pixels in the first 3×5 window of pixels and the second 3×5 window of pixels; and
    averaging the absolute values of differences computed based on the first and second 3×5 windows.

4. The method of claim 3, wherein the first field is next in time relative to the field of the missing pixel, and the second field is previous in time relative to the field of the missing pixel.

5. The method of claim 3, wherein the first field is the interlaced video field of the missing pixel.

6. The method of claim 1, further comprising:
    quantizing each of the first MAD value and the second MAD value.

7. The method of claim 1, wherein selectively blending the first and second MAD values includes:
    computing a blending factor based on values of pixels in the interlaced video; and
    forming the resultant motion value using the blending factor.

8. The method of claim 7, wherein forming the resultant motion value includes: computing a weighted average of the first and second MAD values by using the blending factor.

9. The method of claim 7, wherein computing the blending factor includes: determining whether the pixel is at a horizontal edge of an object.

10. The method of claim 9, wherein the resultant motion value is the first MAD value when the pixel is at a horizontal edge of an object.

11. The method of claim 1, further comprising:
generating a value of the pixel based on the resultant motion value.

12. A method of determining a motion value for a missing pixel in an interlaced video, the method comprising:
selecting a plurality of windows, each window of the plurality of windows having dimensions distinct from dimensions of each other window of the plurality of windows;
computing a plurality of motion values for the missing pixel, each motion value being based on a respective window of the plurality of windows; and
selectively blending the plurality of motion values to form a resultant motion value.

13. The method of claim 12, further comprising:
selecting, for each respective window of the plurality of windows, a first set of pixels from a first field, and a second set of corresponding pixels from a second field, the first field having a same parity as the second field, each of the first and second sets of pixels being a block of pixels within the respective window and having dimensions of the respective window;
wherein computing the plurality of motion values includes computing a motion value based on the respective window using values of pixels in the first set of pixels and the second set of pixels selected for the respective window.

14. The method of claim 12, wherein selectively blending the plurality of motion values includes:
computing a blending factor based on values of pixels in the interlaced video; and
forming the resultant motion value using the blending factor.

15. The method of claim 12, wherein selecting the plurality of windows includes selecting a first plurality of windows and a second plurality of windows, each of the first plurality of windows and the second plurality of windows being associated with pixels selected from a respective pair of fields having a same parity;
wherein computing the plurality of motion values includes computing a first plurality of motion values and a second plurality of motion values, each of the first plurality of motion values being based on a respective one of the first plurality of windows, and each of the second plurality of motion values being based on a respective one of the second plurality of windows;
wherein selectively blending the plurality of motion values includes forming a first resultant motion value by selectively blending the first plurality of motion values and forming a second resultant motion value by selectively blending the second plurality of motion values, each of the first resultant motion value and the second resultant motion value corresponding to a respective pair of fields having the same parity; and
wherein the method further comprises generating a frame motion value based on the first resultant motion value and the second resultant motion value.

16. An apparatus for detecting motion in an interlaced video signal comprising:
a frame motion detector having a first input, a second input, and an output, the first input being configured to receive a first field of the interlaced video signal and the second input being configured to receive a second field of the interlaced video signal, the second field having a same parity as the first field, and the output being configured to produce a resultant frame motion value corresponding to a missing pixel of a current field;
wherein the frame motion detector is configured to:
determine a first motion value based on the first field and the second field by using a first window having a first size,
determine a second motion value based on the first field and the second field by using a second window having a second size, and
selectively blend the first motion value and the second motion value to generate the resultant frame motion value.

17. The apparatus of claim 16, wherein the frame motion detector is a first frame motion detector and the resultant frame motion value is a first resultant frame motion value, the apparatus further comprising:
a second frame motion detector having a first input, a second input, and an output, the first input and the second input of the second frame motion detector being configured to receive respective fields having a same parity, and the output of the second frame motion detector being configured to produce a second resultant frame motion value;
wherein the apparatus is configured to determine a frame motion value based on the first resultant frame motion value and the second resultant frame motion value.

* * * * *